US005801748A

United States Patent [19]

Hohenacker

[11] Patent Number: 5,801,748

[45] Date of Patent: Sep. 1, 1998

[54] APPARATUS FOR STORING PICTURE INFORMATION DISPLAYED ON A MONITOR

[76] Inventor: Thomas Hohenacker, Wilhelmstrasse 4, Muenchen, Germany, D-80801

[21] Appl. No.: 532,737

[22] PCT Filed: Apr. 14, 1994

[86] PCT No.: PCT/EP94/01161

[87] PCT Pub. No.: WO94/24785

PCT Pub. Date: Oct. 27, 1994

[30] Foreign Application Priority Data

Apr. 14, 1993 [DE] Germany .......................... 43 12 185.3

[51] Int. Cl.$^6$ .............................. H04N 5/00; H04N 5/44; H04N 5/46; H04N 5/10

[52] U.S. Cl. ................................ 348/2; 348/513; 348/557

[58] Field of Search .................................. 348/1, 2, 553, 348/3, 4; H04N 5/00, 5/44, 5/46, 5/10

[56] References Cited

U.S. PATENT DOCUMENTS

| | | | |
|---|---|---|---|
| 3,821,466 | 6/1974 | Roese | 348/56 |
| 4,412,230 | 10/1983 | Goldberg . | |
| 4,599,644 | 7/1986 | Fischer | 348/4 |
| 4,613,904 | 9/1986 | Lurie . | |
| 4,697,209 | 9/1987 | Kiewit et al. | 348/1 |
| 4,809,013 | 2/1989 | Cho et al. | 348/1 |
| 5,287,181 | 2/1994 | Holman | 348/1 |
| 5,453,015 | 9/1995 | Vogel | 348/2 |
| 5,465,384 | 11/1995 | Bejan et al. | 348/2 |

FOREIGN PATENT DOCUMENTS

| | | |
|---|---|---|
| 0 127 068 | 12/1984 | European Pat. Off. . |
| 0 358 910 | 3/1990 | European Pat. Off. . |
| 1 913 722 | 11/1969 | Germany . |
| 1 949 397 | 4/1971 | Germany . |
| 33 34 939 A1 | 4/1984 | Germany . |

*Primary Examiner*—Tommy P. Chin
*Assistant Examiner*—Nhon T. Diep
*Attorney, Agent, or Firm*—Townsend and Townsend and Crew LLP

[57] ABSTRACT

A device for storing picture information displayed on a television screen consists of a storage medium made of a photosensitive material which may be secured to the surface of the screen by an active adhesive layer on the screen.

45 Claims, 1 Drawing Sheet

APPARATUS FOR STORING PICTURE INFORMATION DISPLAYED ON A MONITOR

BACKGROUND OF THE INVENTION

The invention relates to a device for the storing of picture information displayed on a monitor, in particular on a television screen.

When receiving customary television programs, the viewer exclusively takes on the role of the passive consumer. Since he is in no way actively required to participate, it is frequently the case that the television evening is largely uninteresting and takes place without any particular highlights.

This leads, on the one hand, to the television companies not achieving the desired viewer quotas due to lack of attractiveness of their programs and, on the other hand, they can obtain no direct and reliable information concerning the number of viewers who have seen a specific program. Such information can presently only be obtained by direct questioning of a small group of statistically selected viewers from which conclusions can be drawn regarding the total viewer quota—however not with the desired reliability.

In order to overcome these disadvantages, it has been attempted to make television programs more interesting by integrating viewer puzzles or viewer surveys into the programs, to which the viewers answer in writing or by telephone. Through the answers that are received, the television broadcaster receives certain information concerning the respective program participation.

The disadvantage of this known method is that there is insufficient enticement for viewers to participate as a result of the always repeating, unchanging program scheme, so that viewer puzzles and viewer surveys cannot be integrated into every type of television program.

SUMMARY OF THE INVENTION

It is therefore an object of the invention to provide a device with which any kind of program can be made more interesting, with which the viewer can be motivated to participate, and by which the television broadcaster or company can obtain information concerning viewer participation.

In accordance with the invention this is achieved with a device for storing picture information shown on a partial area of a monitor, in particular of a television screen. The device has a storage medium of photosensitive material which can be secured to the monitor surface with a bonding layer that is effective at the monitor side.

This device can be used as follows:

The television broadcaster transmits continuously or at a predetermined time a symbol at a defined position of the viewing screen which is preferably represented on a black background. The viewer secures the device of the invention to the viewing screen by means of the adhesive layer in such a way that the symbol illustrated on the viewing screen is covered by the device.

The symbol illustrated on the viewing screen thereby exposes the photosensitive material of the device of the invention so that the picture information of the illustrated symbol is stored in the device of the invention. The storage device of the invention with the stored picture information can then be removed from the television screen and sent, for example, to the television broadcaster.

The storage device of the invention can be used in diverse ways and means. The following are a few examples of such uses:

a) The television broadcaster continuously transmits a certain symbol, for example its transmitter logo, at a defined point of the viewing screen, and the storage device which is to be secured by the viewer at the relevant point of the television screen is equipped with a slightly light-sensitive material so that the storage device becomes fully exposed by the transmitted symbol and the transmitted symbol is actually stored in the device only after hours or days have elapsed.

The exposed storage device can then, for example, be sent by the viewer to the television broadcaster, where the viewer participates in a draw.

In this way, the viewer is motivated to select a specific television station as frequently as possible and for the longest possible period of time during which programs are offered.

The storage devices of the invention can be used in this connection as a type of "fidelity point" and the television broadcaster can then, for example, require that a specific number of exposed storage devices must be sent in for the viewer to participate in a draw.

A desirable subsidiary effect of this manner of use lies in the fact that the viewer will be constrained from changing the channel several times during a given transmission or show, since the storage device applied to the screen would be exposed in a faulty manner by other programs which do not transmit the symbol, and a storage device which is faultily exposed in this manner would not be permitted to participate in the draw. Further, the television broadcaster can draw conclusions concerning the achievable viewing quotas through the number of exposed storage devices which are sent in.

b) The method of a) can be modified in such a way that the symbol is only irradiated during selected episodes of a specific television series, whereby the viewer is motivated not to miss any of the transmitted episodes. The television broadcaster thereby obtains information about the extent to which the viewers are faithful to a particular series.

In the methods of a) and of b) the transmitted symbol can contain a code for a specific program and/or for a specific weekday. On sending in correspondingly exposed storage devices to the television broadcaster, it can be determined which program was seen and/or on which weekday a program was seen.

The present invention can also be used to integrate a selectable number of "fidelity points" into the transmitted symbol with the viewer having the goal of collecting as many fidelity points as possible. This allows one to evaluate individual programs on the basis of their attractiveness or on the basis of their duration by assigning different numbers of fidelity points. An incentive can thereby be provided for the viewers to take increasing account of programs with a low viewing quota in their choice of program.

c) The television broadcaster can, for example, announce in a program magazine that during a specific block of advertising a single advertisement will be transmitted with a symbol at a defined point of the viewing screen. The viewer is then requested to adhere a storage device of the invention at the relevant location on the viewing screen as soon as the advertising spot with the symbol appears during the block of advertising. The light-sensitivity of the storage device is selected in such a way that the symbol transmitted during the advertising spot adequately exposes the storage device so that it becomes stored in the device. After the advertising spot the viewer again removes the storage device from the viewing screen and sends it to the television broadcaster so that he can, for example, participate in a draw.

In this manner one can, on the one hand, draw conclusions about the number of viewers and, on the other hand, the advertising blocks are made more attractive so that the television broadcaster can charge higher prices for the transmission time in the corresponding advertising blocks, or advertising spots having the symbol can be sold at a higher price.

In addition, the television broadcaster can offer and sell to the purchaser of the transmission time the information received with respect to the number of viewers.

d) The method of c) can be modified in such a way that the symbol is transmitted during the entire advertising block, which helps to prevent the viewer switching to another program during advertising blocks which interrupt a specific program, since he is motivated to view the advertising block because of his desire to participate in a draw.

e) During a quiz program, a specific region on the viewing screen is marked by the television broadcaster onto which a storage device made in accordance with the invention is to be applied. In this region, a slowly moving point of light or, in time sequence, a series of different part symbols is, for example, shown, to expose the storage device. The storage device then either stores the track completed by the slowly moving light point or the complete symbol assembled from the superposition of the partially shown symbols, and the stored symbol can then be an answer or a partial answer to a question posed to the public during the quiz program. In just the same way, the stored symbol can for example be an element of a telephone number which is to be selected by the viewer.

Decisive for this method is that the viewer who does not use a storage device of the invention does not see the overall symbol to be found on the viewing screen at any time, because at any given time it is only shown as either a slowly moving light point or a partial symbol. To see the entire symbol, the viewer must use a storage device of the invention.

Furthermore, several such symbols can be simultaneously generated with this method, in which case several storage devices must be applied to different points of the viewing screen.

In this manner, quiz programs can be made more interesting and the viewer can be motivated to actively participate.

f) In a quiz program, a question is posed to the public for which, for example, three alternative answers are offered. For each possible answer a specific area is marked on the viewing screen. The viewer is then required to adhere the storage device of the invention at the point which, in his opinion, corresponds to the correct answer. Finally, a symbol is then transmitted for a short period of time in the region corresponding to the correct answer which sufficiently adequately exposes the applied storage device used so that it results in a storage of the symbol.

If the viewer has selected the correct answer, he can send in his exposed storage device to the television broadcaster, which, for example, entitles him to participate in a draw.

In this manner, a quiz program can also be made more stimulating and, at the same time, as in the case of the method of e), a conclusion can again be drawn concerning the number of participating viewers.

The above-summarized methods are only a few examples of the possible use of the device of the invention; many other use possibilities exist.

In the following, preferred embodiments of the device of the invention are described.

In order to manufacture the storage device of the invention as quickly and as economically as possible, it is recommended that the storage device be essentially flat and formed of different layers. Thus, for example, an adhesive layer can simply be applied to only one photosensitive film. Because of its shallow construction, the storage device can be packaged in space-saving manner, and can therefore be transported and sold in a cost-favorable manner.

The storage medium can, in particular, be formed as a flexible circular disc, although any number of other shapes can be employed. For example, it is possible to give the storage device the form of a transmitter logo.

Photochromic substances are preferably used for the photosensitive material. Photochromic substances are characterized in that they adopt a specific color when irradiated with UV-light and become transparent when irradiated with visible light.

Prior to the storage procedure or exposure to the screen, the photochromic material is irradiated with UV-light to thereby enable a subsequent storage of pictures or symbols which reflect or transmit visible light. Between the irradiation with the UV-light and the exposure, care must be taken that the photosensitive material is not irradiated with visible light, or is only irradiated with visible light for a negligible length of time. For this purpose, the storage medium can be provided on the side remote from the adhesive layer with a light impermeable layer and can be releasably secured with the adhesive layer onto a light impermeable carrier material, such as a postcard.

The exposure time for generating a picture on a photochromic layer is preferably about 30 minutes. When the photosensitive layer consists of several photochromic substances which respond to visible light of different wave lengths, then colored pictures can also be stored in the storage medium of the invention. An advantage in the use of photochromic substances lies in the fact that the photosensitive material can be reused in a simple manner after exposure has taken place by irradiation with UV-light.

A further advantage in the use of photochromic substances is the fact that a very high resolution can be achieved since it is the molecular size of photochromic substances which is the determining factor for the resolution.

In a preferred embodiment, the photosensitive layer is provided at its side remote from the adhesive layer with a reflecting layer, preferably silver or gold, which reflects rays that penetrate through the photosensitive layer back to the latter. This leads to a more intensive exposure of the photosensitive material and shortens the exposure times.

When using photochromic substances, it is useful to design the layer which is applied to the side of the photosensitive layer remote from the adhesive layer in such a way that it is permeable to UV-light and only absorbs visible light. In this case, the photochromic layer can be set by irradiation with UV-light from the side remote from the adhesive layer into a state in which a further storage procedure is optionally possible.

Furthermore, it is possible to influence the frequency selectivity of the photosensitive material with color filters placed in front of it. By placing grey filters in front of it, the intensity of the light which is incident on the photosensitive material can be reduced, which reduces the sensitivity of the photosensitive material results.

The adhesive layer is preferably a self-adhesive layer covered prior to its use by a protective film that can be peeled off. Such a storage device can be conveniently sold and handled by the viewer. The adhesive layer need not, however, be a self-adhesive layer. For example, the storage device can simply be attached to the viewing screen by means of electrostatic forces.

In a further preferred embodiment of the invention, the storage device is made at least substantially transparent. A storage device of this kind can be particularly effectively used with a method described under the point e) above, since in this case—insofar as the storage device is formed so that the stored picture information is immediately developed—the information illustrated by means of part symbols or by means of a wandering light point arises in a manner visible for the viewer at the side of the storage device remote from the viewing screen. For this case it is, however, necessary to use a material as the storage medium which only has a photosensitive layer at the side facing the viewing screen, because otherwise stray light not originating from the television screen would cause a faulty exposure of the storage device.

If no transparent storage medium is used then, for the sake of simplicity, a photosensitive material which is sensitive to light from both sides can be used, since the storage device can then be provided at the side remote from the viewing screen with a light impermeable layer. Any desired text or any desired symbol can then be printed onto this layer in a manner visible to the viewer, which the viewer then sees during the entire time in which the storage device is attached to the viewing screen. For example, the transmitter logo can be shown or the side of the storage device remote from the monitor can be used as an advertising surface, which is particularly for use with the method of point c) above, since the emblem of the company in whose advertising spot the symbol to be stored is transmitted can, for example, be applied to the storage device.

Furthermore, it is possible to make the storage medium frequency-selective, so that it only reacts to defined light wavelengths, for example to light wavelengths of a specific color. This has the advantage that the symbol to be stored need not necessarily be irradiated onto a black background, but rather can directly appear on the transmitted television picture, since the colors of the symbol can be so selected that they do not appear, or only appear on the actual television picture to a small degree, so that no faulty exposure of the storage device takes place even though the television picture forms the background of the symbol.

At least one plastic lens can be arranged between the viewing screen and the storage medium and is preferably formed as a Fresnel lens. A lens of this kind can be integrated without difficulties in the layer-like assembly of the storage device of the invention.

The lens can, for example, serve to focus the symbol, which is imaged in an unsharp manner onto the viewing screen, so that it is sharply imaged on the storage medium.

Furthermore, it is possible to provide a lens which acts as a decoding lens and forms a decoded image of a symbol that is shown on the viewing screen in coded manner. A lens of this kind is preferably used in a method as described in point e) above, since it then becomes possible to dispense with illustrating the symbol to be stored in the form of partial symbols or in the form of a wandering light point.

The storage device of the invention can be so designed that the developer which makes the stored picture information visible is integrated into the storage device, or in such a way that the stored picture information can be subsequently developed by a developing layer or developing fluid which can be brought into contact with the storage device.

In a further preferred embodiment of the invention, the storage medium can have a picture recognition chip, by means of which the optical picture information is convertible into electronic signals, with the electronic signals then being storable in an electronic memory integrated into the picture recognition chip. As a picture recognition chip one can, for example, use a component which is similar to that which is used in customary video cameras.

As a further alternative the storage medium can be provided with an acoustical output unit which generates a specific acoustic signal in dependence on the stored electronic data. This signal can, for example, be transmitted via a telephone from the viewer to the television broadcaster. In this manner, the broadcaster can check whether the correct picture information is stored in the viewer's picture recognition chip. In this case, the viewer does not have to send the exposed storage medium to the broadcaster, but rather can transmit the corresponding information simply by telephone. A further advantage of the use of a picture recognition chip lies in the fact that the data stored therein can be erased so that the storage device becomes reusable.

It is particularly advantageous when the storage device of the invention is mounted, at the time of purchase by the viewer, on a carrier material of paper, card, or laminated card, which may have a postcard format. In this manner, the storage device can be conveniently sold and, after the exposure of the storage device, the viewer has a postcard-like carrier material onto which he can secure the exposed storage device and return it to the television broadcaster.

Furthermore, it is advantageous to releasably attach the storage device to the postcard-like carrier with its adhesive layer. In this case, the provision of a protective film which covers the adhesive layer can be dispensed with. The adhesive layer can also be used after the exposure of the storage device to secure the storage medium onto the postcard-like carrier material.

It is of course possible to attach more than one storage device on the carrier material.

The carrier material preferably has at least one development area in which a chemical substance is integrated for developing the picture stored on a storage medium and onto which the storage medium can be attached after its exposure, such as by means of an adhesive layer. In this case the development of the stored picture information takes place right after the exposed storage device has again been attached to the postcard-like carrier material. The need for special developing of the picture information by the viewer or by the television broadcaster is thereby avoided.

The carrier material can be formed of foldable paper or card. By correspondingly folding the carrier material, it can be used to cover the storage device on both sides to prevent its exposure from either its front or back. This is of advantage when photochromic substances are used as the photosensitive material which, on the side remote from the adhesive layer, are not protected by a layer impermeable to visible light.

The attractiveness of quiz programs or of detective programs suitable for children can, for example, be increased by portraying the answers to specific questions, or information relating to the solution of a case with detective stories, in coded form at a specific area of the viewing screen so that it becomes visible to the viewer only by means of a decoding lens. A decoding lens of this kind can be attached to the viewing screen with either an adhesive layer or by holding a frame resembling a magnifying glass in front of the viewing screen. The latter alternative is particularly suitable for children. As a result of the information obtained in this way, a specific telephone number can for example be selected by the viewer or a specific word solution can be sent in to the television broadcaster.

DESCRIPTION OF THE PREFERRED EMBODIMENTS

Figure 1:
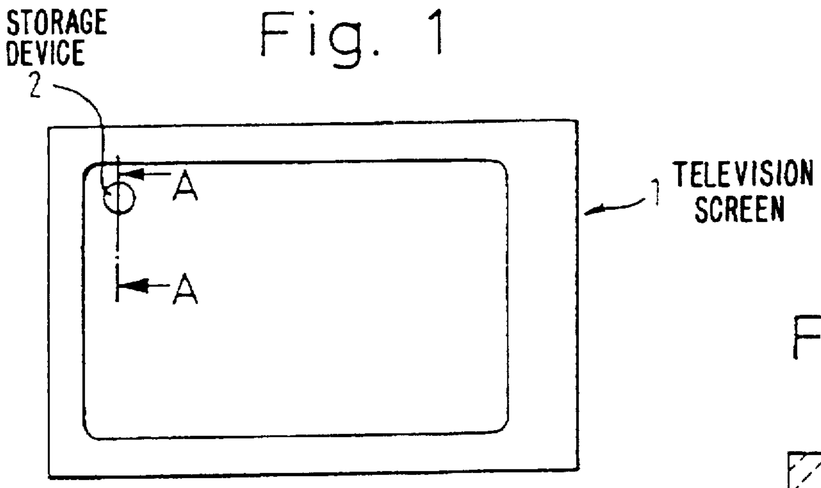
FIG. 1 shows a viewing screen with a storage device made in accordance with the invention.

FIG. 1 schematically shows the front of a monitor or of a television screen 1. In the upper left corner of the viewing screen, a circular disc-like storage device 2 made in accordance with the invention is attached directly to the mat screen and covers a portion of the area of a television picture which is shown on the viewing screen.

Figure 2:
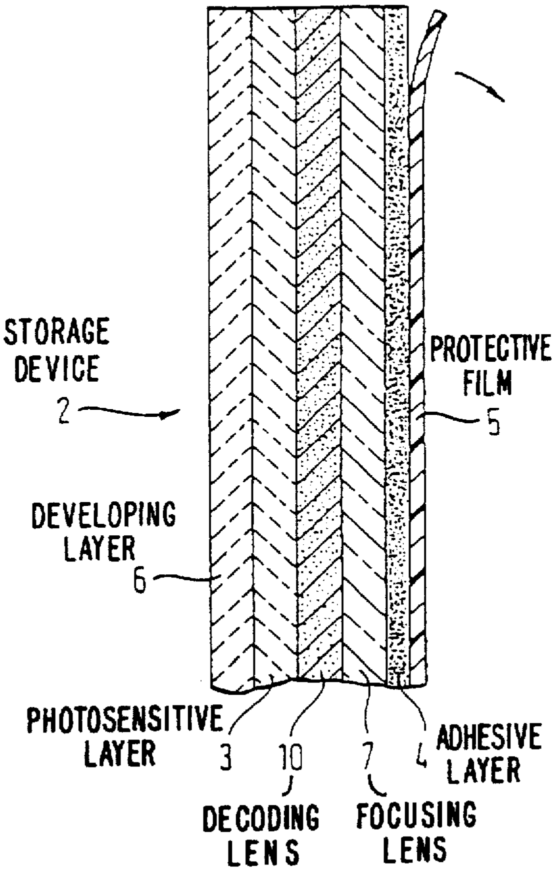
FIG. 2 is a greatly enlarged section taken along line A—A through a storage device shown in FIG. 1.

FIG. 2 is a greatly enlarged section through the storage device 2 shown in FIG. 1 before it is applied to the viewing screen.

The storage device 2 is layered and has an adhesive layer 4 on the viewing screen side. Prior to the use of storage device 2 the adhesive layer is covered by a protective film 5 which can be peeled off by the user of the storage device from the adhesive layer 4 in the direction of the shown arrow. The storage device 2 is secured to a viewing screen with the adhesive layer 4 and it can be exposed following the removal of the protective film 5.

A focusing lens 7 adjoins the adhesive layer 4 and focuses the television picture which is imaged in non-sharp manner onto the mat screen in such a way that a focused image is formed on the photosensitive layer 3. A layer 10 which acts as a decoding lens is located between the photosensitive layer 3 and the focusing lens layer 7 by means of which the coded information shown on the viewing screen can be imaged in decoded form on photosensitive layer 3.

A developing layer 6 adjoins the photosensitive layer 3 by means of which the photosensitive layer 3 can be directly developed after its exposure.

All layers are preferably manufactured from flexible material, which facilitates the release or removal of the storage device from a viewing screen.

To practice the invention it is not necessary to provide all layers shown in FIG. 2. It is only essential that either the photosensitive layer 3 or the decoding lens layer 10 be provided, which can for example also be attached to the viewing screen without an adhesive layer 4 by means of electrostatic forces.

Figure 3:
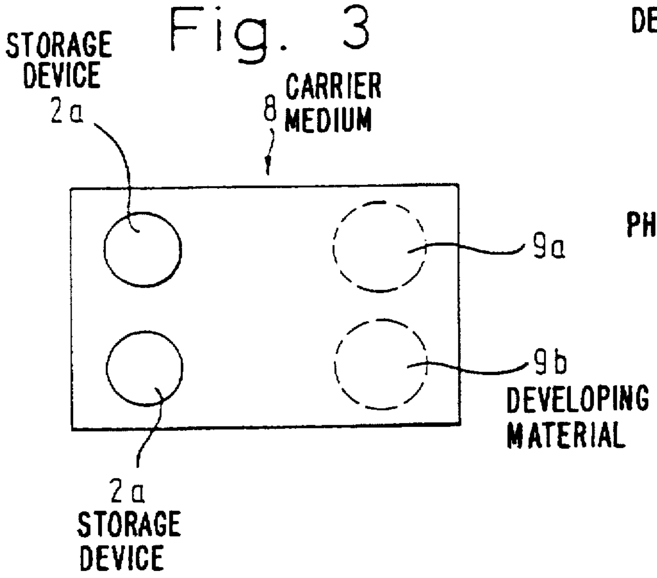
FIG. 3 is a plan view of a carrier material for a storage device made in accordance with the invention.

FIG. 3 shows a carrier material 8 for two storage devices 2*a* and 2*b* made in accordance with the invention. The carrier material 8 can for example be manufactured from card and have the format of a postcard. In this form, the storage device of the invention can be sold in a particularly advantageous manner, since, on the one hand, it can be used as a carrier material for sale and, on the other hand, it can also be used as a carrier material for returning the exposed storage devices.

Prior to the use of the storage devices 2*a* and 2*b* they are releasably arranged on a specific region of the carrier material 8. Adjacent to this region there are further regions 9*a* and 9*b* where a developing material is placed with which the storage devices 2*a* and 2*b* can be developed after their exposure. After their development, the storage devices 2*a* and 2*b* can remain on the regions 9*a* and 9*b* and can be jointly sent in with the carrier material 8 as a postcard to the television broadcaster. A single storage device or also a plurality of storage devices can be sold with the carrier material 8. The number of developing areas 9*a* and 9*b* on the carrier material 8 corresponds to the number of storage devices on the carrier material.

Should the chemical substance for the developing of the stored picture information already be integrated into the storage device, then the developing regions 9*a* and 9*b* on the carrier material 8 are omitted.

The address of the television broadcaster is preferably printed onto the non-illustrated rear side of the carrier material 8.

The device of the invention can also be used with a computer monitor.

What is claimed:

1. Device for storing picture information shown on a part area of a video monitor comprising a storage medium of photosensitive material responsive to a display appearing on the video monitor for forming a lasting record of the display, an adhesive layer on a side of the material facing the video monitor, and means coupled to the photosensitive material and adapted for transporting the device including the record to a location remote from the video screen.

2. A method for motivating viewers to select a particular program with which a content provider sends information for display on a screen comprising the steps of:

providing the viewer with an object adapted to be positioned on the screen;

inducing the viewer to apply the object to a predetermined location on the screen and select the particular program while the object is applied to the predetermined location to thereby form a record on the object which reflects a display on the screen;

informing the viewer to return the object to the content provider after the record has been formed on the object to evidence that the viewer has selected the particular program; and thereafter receiving the object including the record at the content provider.

3. A method according to claim 2 including the step of returning the object to the content provider.

4. A method according to claim 2 including the step of displaying a symbol at the predetermined location on the screen when the particular program is selected on the monitor.

5. A method according to claim 2 wherein the screen comprises a TV set and the particular program comprises a TV show appearing on a selected channel of the TV set, and wherein the step of inducing comprises advising the viewer to tune the TV set to the selected channel.

6. A method for enhancing the number of viewers who view a television show on a particular television channel assigned to a broadcaster and to which a TV set having a viewing screen is tuned, the method comprising the steps of:

displaying a symbol at a predetermined location on the screen when the particular television channel is selected;

providing the viewer with an object adapted to be positioned on the screen at the predetermined location;

inducing the viewer to tune the TV set to the particular television channel and to apply the object to the predetermined location on the screen by providing instructions to the viewer as to when, how and where to apply the object to the screen so that the object includes a record of a display on the screen; and instructing the viewer to return the object including the record to the content provider after the object was applied to the predetermined location on the screen while the particular television channel was selected as evidence of having selected the particular television channel.

7. A method according to claim 6 including the step of recording on the object evidence that the viewer has selected the particular program.

8. A method according to claim 7 wherein the step of recording comprises the step of making a record of the image on the object.

9. A method of motivating viewers to select a particular program with which a content provider sends information for display on a video screen comprising the steps of:

providing the viewer with an object adapted to be positioned over a portion of the screen;

incorporating in the object a material capable of sensing information which is present on the screen when the screen displays the particular program;

inducing the viewer to apply the object to the portion of the screen and to select the particular program; and motivating the viewer to return the object to the content provider after and as evidence that the viewer has placed the object over the portion of the screen when the particular program was displayed on the screen.

10. A method according to claim 9 including forming a record of the information with the material of the object.

11. A method according to claim 10 including the step of transporting the object including the record from the portion of the screen to the content provider.

12. A method according to claim 11 wherein the content provider is a television broadcaster.

13. A method of generating interaction between a television broadcaster who broadcasts a particular program from a broadcast location and television viewers who view the broadcast on individual television screens located remote from the broadcast location, the method comprising the steps of:

making a recording object comprising a material sensitive to information appearing on the screen and a substrate for the material;

distributing the objects to potential viewers of the program;

instructing the potential viewers to place the object onto an area of the screen when the program is broadcast;

causing the information to appear at the area of the screen in a form which causes the information to be recorded by the material;

applying the object to the area of the screen so that the material is exposed to the information when it appears at the area;

thereafter removing the object from the screen;

advising the viewer to return the object including the information recorded by the material to a designated location; and transporting the object including the recorded information to the location.

14. A method according to claim 13 wherein the step of making comprises the step of including a photosensitive material on the object, and wherein the step of recording comprises forming an optical image of the information on the photosensitive material.

15. A device for proving to a third party that a video screen of a viewer displayed a particular video program comprising a material sensitive to information containing radiation emanating from the screen so that the material forms a lasting record of the radiation to which the material was exposed, and a substrate connected to the material so that the substrate and the material can be attached to the screen in the manner in which the material is exposed to the radiation emanating from the screen, the substrate being further adapted to transport the device from the screen to the third party following the exposure of the material to the radiation emanating from the screen; whereby the device includes a record of the information which can be evaluated by the third party upon receipt of the device.

16. A device according to claim 15 wherein the material and the substrate are flat and have a substantially circular shape.

17. A device according to claim 15 including a self-adhesive layer applied to a side of the substrate which faces the video screen when applied thereto.

18. A device according to claim 17 including a protective film applied over the self-adhesive layer and adapted to be removed therefrom before the device is applied to the video screen.

19. A device according to claim 15 wherein the material comprises a photosensitive material and the radiation forms an image on the screen, and including a chemical substance for developing the image formed on the photosensitive material following the exposure of the photosensitive material to the image on the video screen to permit viewing of the developed image.

20. A device according to claim 15 wherein the radiation forms an image, and the material comprises a frequency selective photosensitive material which responds only to predefined light wavelengths of the image on the video screen.

21. A device according to claim 20 wherein the predefined wavelengths comprise light wavelengths of a predetermined color.

22. A device according to claim 15 wherein the radiation forms an image and the material is a photosensitive material, and including a lens positioned over the photosensitive material for focusing the image on the photosensitive material.

23. A device according to claim 22 wherein the lens comprises a Fresnel lens.

24. A device according to claim 15 wherein the radiation forms a coded display and the material comprises a photosensitive material, and including a decoding lens placed over the photosensitive material and adapted to decode the coded display and form an image of the decoded display on the photosensitive material.

25. A device according to claim 15 wherein the radiation forms a video display and the material comprises a picture recognition chip converting the display appearing on the video screen into electronic signals and storing the electronic signals.

26. A device according to claim 25 including means operatively coupled with the recognition chip for converting the stored electronic signals into an acoustic output.

27. A device according to claim 15 wherein the radiation forms a display comprising the information and the material comprises a photochromic substance.

28. A device according to claim 27 wherein the photochromic substance is sensitive to UV-light and to visible light and forms an image from the display upon irradiation by the UV-light and becomes transparent upon irradiation by visible light.

29. A device according to claim 27 including a plurality of different photochromic substances, each substance being sensitive to light of different wavelengths so that a colored image is generated when the display is a colored display and the photochromic substances are exposed to the colored display.

30. A device according to claim 15 wherein the material comprises a photosensitive material, and including a light reflective layer located on a side of the photosensitive material opposite a side thereof facing the video screen so that the radiation from the screen is reflected by the layer back to the photosensitive material.

31. A device according to claim 15 including a layer on a side of the material opposite a side thereof facing the video screen when the device is applied to the screen, the layer being transparent to UV-light and preventing the passage of visible light.

32. A device according to claim 15 wherein the material is a photosensitive material, and including a grey filter on a side of the photosensitive material facing the video screen when the device is applied thereto.

33. A device according to claim 15 wherein the material comprises a layer of the material and including means for releasably securing the material layer to the substrate.

34. A device according to claim 33 wherein the substrate is selected from the class consisting of paper, card and laminated card.

35. A device according to claim 34 wherein the substrate has a postcard format.

36. A method according to claim 35 including the step of returning the object with the record of the image to the content provider.

37. A device according to claim 34 wherein the material is a photosensitive material, and the substrate has a size larger than a size of the photosensitive material and the substrate includes on a side thereof a chemical substance for developing the photosensitive material following its exposure to the radiation emanating from the video screen.

38. A device according to claim 37 wherein at least one side of the substrate includes a first area free of the chemical substance for attachment of the photosensitive material prior to its exposure to the radiation and wherein the substrate includes a second area which contains the chemical substance and to which the photosensitive material can be attached following the exposure of the photosensitive material to the radiation.

39. A device according to claim 38 including an adhesive layer for attaching the photosensitive material to the first and second areas.

40. An inexpensive, mass-distributable device for obtaining an indication who viewed a given television program transmitted to the public, the device comprising a photosensitive material adapted to be temporarily placed over a specified region of a video screen for forming a permanent record from radiation emanating from the screen, first and second protective layers covering the photosensitive material when not applied to the video screen, the layers protecting the photosensitive material from radiation to which it is sensitive, and means permitting removal of the protective layer placed over a side of the photosensitive material that is to face the specified region of the video screen.

41. A device according to claim 40 wherein the means permitting removal of the protective layer comprises an adhesive material, the adhesive material being suitable for attaching the side of the photosensitive material to the video screen.

42. A device according to claim 40 wherein one of the protective layers has a size substantially larger than a size of the photosensitive material to facilitate transport of the device to and from a viewer of the television program.

43. A device for storing picture information shown on a part area of a video screen, comprising a storage medium of photosensitive material which can be secured to a surface of the screen by means of an adhesive layer effective on a side of the material that is to face the screen, at least one of a plastic focusing lens arranged between the adhesive layer and the storage medium for sharply imaging the picture information onto the storage medium, and a plastic decoding lens for forming an image in decoded form on the storage medium from the picture information is displayed on the screen in coded form.

44. A device for storing picture information shown on a part area of a video screen, comprising a storage medium sensitive to radiation emanating from the screen and which can be secured to a surface of the screen by means of an adhesive layer effective on a side of the material that is to face the screen, the storage medium including a picture recognition chip in which the picture information shown on the video screen can be converted into and stored as electronic signals.

45. A device according to claim 44 wherein the recognition chip has an acoustic output device which transmits an acoustic signal in dependence on the stored picture information.

* * * * *